(12) United States Patent
Baumann

(10) Patent No.: US 7,837,261 B2
(45) Date of Patent: Nov. 23, 2010

(54) SEAT ARRANGEMENT

(75) Inventor: Jürgen Baumann, Bodman-Ludwigshafen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 32 days.

(21) Appl. No.: 12/310,136

(22) PCT Filed: Aug. 16, 2007

(86) PCT No.: PCT/EP2007/007253
§ 371 (c)(1), (2), (4) Date: Feb. 12, 2009

(87) PCT Pub. No.: WO2008/019858
PCT Pub. Date: Feb. 21, 2008

(65) Prior Publication Data
US 2009/0236896 A1    Sep. 24, 2009

(30) Foreign Application Priority Data
Aug. 17, 2006    (DE) .................. 10 2006 038 771

(51) Int. Cl.
*B60N 2/42* (2006.01)
(52) U.S. Cl. .................. 297/216.13; 297/216.1; 297/216.15
(58) Field of Classification Search ............. 297/216.1, 297/216.13, 216.14, 216.15, 216.16, 216.17, 297/216.18, 216.19, 216.2
See application file for complete search history.

(56) References Cited
U.S. PATENT DOCUMENTS

| | | | | |
|---|---|---|---|---|
| 3,582,133 A | * | 6/1971 | DeLavenne | 297/216.1 X |
| 3,802,737 A | * | 4/1974 | Mertens | 297/216.2 |
| 3,977,725 A | * | 8/1976 | Tengler et al. | 297/216.1 X |
| 4,688,662 A | * | 8/1987 | Correll | 297/216.1 X |
| 4,763,924 A | * | 8/1988 | Karlin et al. | 297/216.18 X |
| 5,005,894 A | * | 4/1991 | Nagata | 297/216.2 X |
| 5,069,505 A | | 12/1991 | Amthor et al. | |
| 5,507,552 A | * | 4/1996 | Ineich et al. | 297/216.1 |

(Continued)

FOREIGN PATENT DOCUMENTS

DE    36 38 231 A1    5/1988

(Continued)

OTHER PUBLICATIONS

Search Report mailed on Aug. 17, 2006 for the corresponding German patent application No. 10 2006 038 771.6.

(Continued)

*Primary Examiner*—Rodney B White
(74) *Attorney, Agent, or Firm*—Posz Law Group, PLC

(57) ABSTRACT

A seat arrangement for an aircraft seat includes a seat frame for mounting the seat on a cabin floor and a seat region. The seat arrangement has a backrest unit and is designed to improve stiffness of the backrest unit against one-sided torsional load. The backrest unit is coupled to the seat frame by a kinematic unit having at least first and second kinematic parts coupled to a first side and a second side of the backrest unit, respectively. A stiffening member is located in the seat region that couples the first and second kinematic parts and is provided for transmitting a torsional moment from the first side of the backrest unit to the second side of the backrest unit.

9 Claims, 2 Drawing Sheets

U.S. PATENT DOCUMENTS

Figure 1:
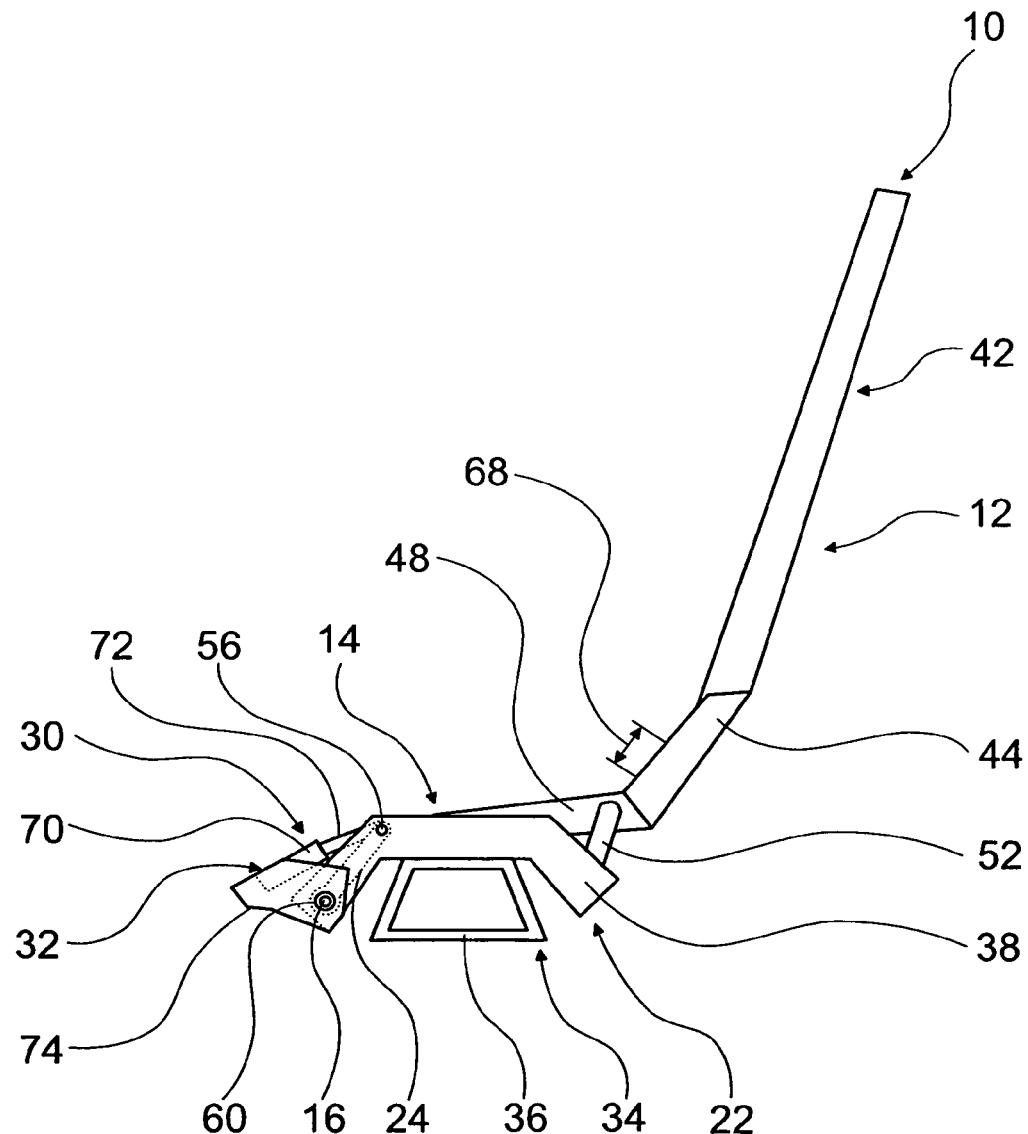

| | | | |
|---|---|---|---|
| 5,645,316 A * | 7/1997 | Aufrere et al. | 297/216.13 |
| 5,839,782 A * | 11/1998 | Kashiwamura et al. | 297/216.1 X |
| 6,352,312 B1 * | 3/2002 | Rees | 297/216.1 X |
| 6,367,859 B1 * | 4/2002 | Flory et al. | 297/216.13 X |
| 6,505,890 B2 * | 1/2003 | Riley et al. | 297/216.1 X |
| 6,669,143 B1 | 12/2003 | Johnson | |
| 6,715,788 B2 * | 4/2004 | Saiguchi et al. | 297/216.1 X |
| 6,719,368 B1 * | 4/2004 | Neale | 297/216.14 |
| 6,739,658 B2 * | 5/2004 | Pedronno et al. | 297/216.1 |
| 6,921,132 B2 * | 7/2005 | Fujita et al. | 297/216.13 |
| 6,926,358 B2 * | 8/2005 | Fujita et al. | 297/216.14 |
| 7,021,655 B2 * | 4/2006 | Saiguchi et al. | 297/216.1 X |
| 7,140,684 B2 | 11/2006 | Wagner et al. | |
| 7,156,457 B2 * | 1/2007 | Fujita et al. | 297/216.1 |
| 7,222,916 B2 * | 5/2007 | De Wilde et al. | 297/216.14 |
| 7,303,229 B2 * | 12/2007 | Fujita et al. | 297/216.14 |
| 7,416,256 B2 * | 8/2008 | Fujita et al. | 297/216.1 X |
| 7,496,457 B2 * | 2/2009 | Fujita et al. | 297/216.15 X |
| 7,527,334 B2 * | 5/2009 | Kiehler et al. | 297/216.13 |
| 2002/0175547 A1 | 11/2002 | Bentley | |
| 2003/0020306 A1 * | 1/2003 | Eckendorff | 297/216.1 |
| 2003/0102701 A1 * | 6/2003 | Pedronno et al. | 297/216.1 |
| 2003/0116999 A1 * | 6/2003 | Fujita et al. | 297/216.13 |
| 2003/0137174 A1 | 7/2003 | Bentley et al. | |
| 2004/0178667 A1 * | 9/2004 | Fujita et al. | 297/216.1 |
| 2004/0232283 A1 | 11/2004 | Ferry et al. | |
| 2004/0232743 A1 * | 11/2004 | Fujita et al. | 297/216.1 |
| 2005/0231011 A1 * | 10/2005 | Fujita et al. | 297/216.14 |
| 2006/0103191 A1 * | 5/2006 | De Wilde et al. | 297/216.14 |
| 2006/0138817 A1 * | 6/2006 | Gorman et al. | 297/216.15 |
| 2007/0069073 A1 | 3/2007 | Ferry et al. | |

FOREIGN PATENT DOCUMENTS

| | | |
|---|---|---|
| DE | 39 18 500 C2 | 12/1990 |
| DE | 41 29 671 A1 | 3/1993 |
| DE | 196 48 974 A1 | 5/1997 |
| DE | 101 07 197 A1 | 10/2002 |
| FR | 1 586 051 | 2/1970 |
| GB | 1 060 383 A | 3/1967 |

OTHER PUBLICATIONS

International Search Report mailed on Jun. 12, 2007 for the corresponding International patent application No. PCT/EP2007/007253 (English translation enclosed).

* cited by examiner

SEAT ARRANGEMENT

PRIOR ART

The invention is based on a seat arrangement according to the precharacterizing clause of claim 1.

A seat arrangement with a backrest unit and a fixing unit is already known, said fixing unit being provided for locking the backrest unit in a plurality of positions. For this purpose, the fixing unit has fixing means arranged symmetrically on both sides.

ADVANTAGES OF THE INVENTION

The invention is based on a seat arrangement, in particular for an aircraft seat, with a backrest unit.

It is proposed that the backrest unit has at least one stiffening means in a seat region. In this case, a seat region is to be understood in particular as meaning a region which is arranged in a seat, as viewed in the operational position thereof, below a lumbar region of the backrest unit, which lumbar region is provided in particular for lumbar support. By means of an appropriate configuration, weight, components, costs and/or outlay on installation can be saved. In particular, a fixing unit which is provided for locking the backrest unit in at least one position and which has only a single fixing means arranged on one side, in particular on one side of the backrest unit, can be provided. A fixing means can be avoided on a second side of the backrest unit and, in association therewith, components, weight, costs and outlay on installation can be saved.

In a further configuration of the invention, it is proposed that the stiffening means extends from a first side region into a second side region of the backrest unit, as a result of which the two side regions can advantageously be coupled via the stiffening means, and forces and/or moments acting on the one side region of the backrest unit can be transmitted to the other side region of the backrest unit by means of the stiffening means and therefore stiffening can be achieved. In this case, a side region of a backrest unit is to be understood in particular as meaning a region defined by a support part of the backrest unit.

Furthermore, it is proposed that the seat arrangement has a kinematic unit via which the backrest unit is coupled to a seat frame, as a result of which a movement of the backrest unit can advantageously be coupled to a seat base.

If two kinematic parts of the kinematic unit are coupled via the stiffening means, an advantageous force flux can be obtained, to be precise in particular if the stiffening means is formed by a torsion rod which is provided for transmitting a torsional moment. Furthermore, a force introduced on the one side region of the backrest unit can be transmitted in a particularly space-saving manner to the second side region by a stiffening means formed by a torsion rod.

The stiffening means can furthermore be integrated in a particularly space-saving manner if the same is coupled in a rotationally fixed manner to at least one kinematic part formed by a pivotable lever, and preferably to at least two kinematic parts of the kinematic unit, which kinematic parts are formed by pivotable levers, and in particular if the stiffening means is arranged coaxially with respect to a pivot axis at least for one kinematic part formed by a lever.

The stiffening means is preferably formed by a tube, thus making it possible to achieve a component having a high degree of rigidity, in particular a high degree of torsional rigidity, and a low weight, which component is advantageously suitable for transmitting a torque or torsional moment, to be precise in particular if said component is designed with a round cross-sectional area.

In a further configuration of the invention, it is proposed that the seat arrangement comprises a seat support arrangement with an individual seat supporting bar unit, as a result of which components and weight can be saved and in addition a required construction space can be reduced and a "living space" can be increased.

Owing to the possible reduction in weight, the seat arrangement according to the invention is suitable in particular for an aircraft seat, but in principle a corresponding seat arrangement can also be used in other seats appearing suitable to a person skilled in the art, such as, in particular, in motor vehicle seats, seats for lecture halls, etc.

DRAWING

Further advantages emerge from the description below of the drawing. The drawing illustrates an exemplary embodiment of the invention. The drawing, the description and the claims contain numerous features in combination. The person skilled in the art will expediently also consider the features individually and combine them to form meaningful further combinations.

Figure 2:
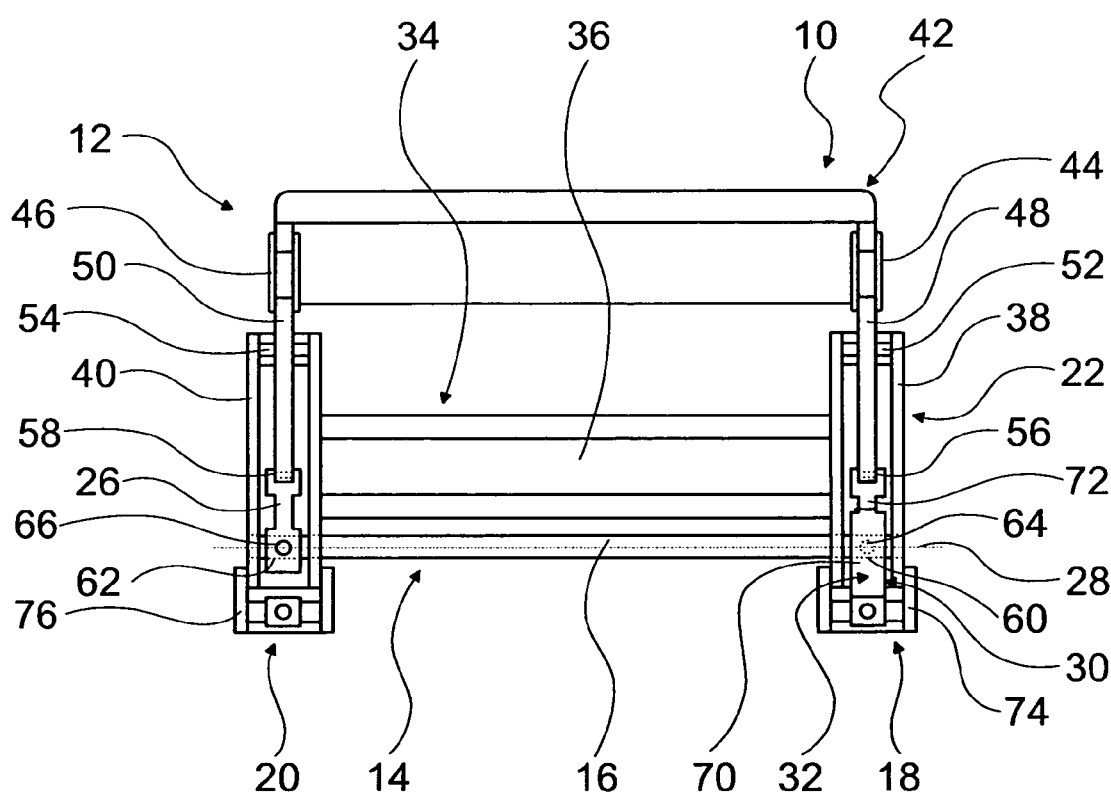

In the drawing:

FIG. 1 shows a schematically illustrated aircraft seat with a seat arrangement according to the invention in a side view, and FIG. 2 shows the aircraft seat from FIG. 1 from above.

DESCRIPTION OF THE EXEMPLARY EMBODIMENT

FIG. 1 shows a schematically illustrated aircraft seat 10 with a seat arrangement according to the invention, in a side view. The seat arrangement comprises a backrest unit 12 which is coupled via a kinematic unit 22 and via a seat support arrangement 34 to a seat frame (not illustrated specifically) which is provided to be mounted on a cabin floor of an aircraft. The seat support arrangement 34 comprises an individual seat supporting bar unit 36 which is coupled or connected fixedly to supporting bars 38, 40 of the kinematic unit 22 (FIGS. 1 and 2).

The backrest unit 12 has a stiffening means 16 which is arranged in a seat region 14 below a lumbar region 68 for the lumbar support of a passenger, to be precise in a front seat base region in front of the seat supporting bar unit 36 and which extends transversely with respect to the flying direction from a first side region 18 into a second side region 20 of the backrest unit 12, or from one side of the seat base region to an opposite side of the seat base region.

The backrest unit 12 comprises a substantially U-shaped support unit 42 extending into a head region of the backrest unit 12. On a side facing the seat base region, the sides of the backrest unit 12 have a respective support part 44, 46 which is coupled rigidly to the support unit 42 and is coupled rigidly in each case to support parts 48, 50 of the backrest unit 12, which support parts extend into the seat base region.

The support parts 48, 50 are coupled in a rear seat base region via pivotably mounted levers 52, 54 of the kinematic unit 22 to the supporting bars 38, 40 of the kinematic unit 22. Furthermore, the support parts 48, 50 are coupled pivotably in coupling points 56, 58 in a front seat base region to kinematic parts 24, 26 of the kinematic unit 22, which kinematic parts are formed by levers and in turn are coupled pivotably in coupling points 60, 62 to the supporting bars 38, 40.

The stiffening means 16 formed by a tubular torsion rod is provided for transmitting a torsional moment between the two kinematic parts 24, 26, which are designed as levers, and is arranged for this purpose coaxially with respect to a pivot axis 28 of the kinematic parts 24, 26, is mounted rotatably in the supporting bars 38, 40 and is connected in a rotationally fixed manner to the kinematic parts 24, 26, to be precise via respective transverse bolts 64, 66 extending through the stiffening means 16 and respectively through the kinematic parts 24 and 26.

Furthermore, the seat arrangement comprises a fixing unit 30 which is provided for locking the backrest unit 12 in a plurality of positions, the fixing unit 30 having an individual fixing means 32 arranged on one side in the region of the supporting bar 38. A fixing means is not arranged in the region of the supporting bar 40. The fixing means 32 comprises a piston which is guided in a hydraulic cylinder 70 and is coupled via a piston rod 72 to a free end of the support part 48. On the side facing away from the free end of the support part 48, the hydraulic cylinder 70 is supported in a support part 74 fastened to the supporting bar 38. A support part 76 corresponding to the support part 74 is fastened to the supporting bar 40. The mounting of the support parts 48, 50 within the kinematic unit 22 is identical except for the fixing unit 30, and the kinematic unit 22 is of identical design in the side regions of the seat base apart from the fixing unit 30. If a manual load occurs in a side region of the backrest unit 12, said manual load is transmitted as a torque or torsional moment via the levers or kinematic parts 52, 24 or 54, 26 facing said side region to the stiffening means 16 and via the stiffening means 16 to the opposite side region of the backrest unit 12, as a result of which the backrest unit 12 is stiffened, in particular compared to a corresponding configuration without the stiffening means 16.

REFERENCE NUMBERS

10 Aircraft seat
12 Backrest unit
14 Seat region
16 Stiffening means
18 Side region
20 Side region
22 Kinematic unit
24 Kinematic part
26 Kinematic part
28 Pivot axis
30 Fixing unit
32 Fixing means
34 Seat support arrangement
36 Seat supporting bar unit
38 Supporting bar
40 Supporting bar
42 Support unit
44 Support part
46 Support part
48 Support part
50 Support part
52 Lever
54 Lever
56 Coupling point
58 Coupling point
60 Coupling points
62 Coupling points
64 Transverse bolt
66 Transverse bolt
68 Lumbar region
70 Hydraulic cylinder
72 Piston rod
74 Support part
76 Support part

The invention claimed is:

1. A seat arrangement for an aircraft seat having a seat frame, which is provided for mounting the seat on a cabin floor, and a seat region, comprising:
a backrest unit with a lumbar region, and the seat region is located below the lumbar region of the backrest unit; and
a kinematic unit including at least first and second kinematic parts, wherein
the backrest unit is coupled to the seat frame by the kinematic unit;
the at least first and second kinematic parts of the kinematic unit are coupled to a first side of the backrest unit and a second side of the backrest unit, respectively,
the backrest unit has at least one stiffening member in a the seat region, and the stiffening member transmitting a torsional moment from the first side of the backrest unit to the second side of the backrest unit, and
the at least first and second kinematic parts of the kinematic unit are coupled by the stiffening member.

2. The seat arrangement as claimed in claim 1, wherein the stiffening member is formed by a torsion rod.

3. The seat arrangement as claimed in claim 1, wherein the stiffening member is coupled in a rotationally fixed manner to at least the first kinematic part, and wherein the first kinematic part is formed by a pivotal lever.

4. The seat arrangement as claimed in claim 3, wherein the stiffening member is further coupled in a rotationally fixed manner to the second kinematic part, and wherein the second kinematic part is formed by a pivotal lever.

5. The seat arrangement as claimed in claim 3, wherein the stiffening member is coaxial with a pivot axis of at least the first kinematic part.

6. The seat arrangement as claimed in claim 1, wherein the stiffening member is formed by a tube.

7. The seat arrangement as claimed in claim 1, wherein the seat arrangement includes a fixing unit, which is provided for locking the backrest unit in at least one position, and wherein the fixing unit has an individual fixing means.

8. The seat arrangement as claimed in claim 1, wherein the seat arrangement includes a seat support arrangement with an individual seat supporting bar unit.

9. An aircraft seat, comprising:
a seat frame, provided for mounting the seat on a cabin floor;
a seat arrangement having a backrest unit with a lumbar region and a kinematic unit including at least first and second kinematic parts, wherein the backrest unit is coupled to the seat frame by the kinematic unit; and
a seat region located below the lumbar region of the backrest unit, wherein
the at least first and second kinematic parts of the kinematic unit are coupled to a first side of the backrest unit and a second side of the backrest unit, respectively,
the backrest unit has at least one stiffening member in the seat region that transmits a torsional moment from the first side of the backrest unit to the second side of the backrest unit, and
the at least first and second kinematic parts of the kinematic unit are coupled by the stiffening member.

* * * * *